United States Patent [19]

Hood

[11] 4,049,156

[45] Sept. 20, 1977

[54] THERMALLY-RESPONSIVE LIQUID DISPENSER

[75] Inventor: Charles B. Hood, Columbus, Ohio

[73] Assignee: Chardon Laboratories, Inc., Columbus, Ohio

[21] Appl. No.: 610,114

[22] Filed: Sept. 4, 1975

[51] Int. Cl.² ............................................. B65D 83/14
[52] U.S. Cl. ..................................... 222/54; 222/204
[58] Field of Search ................. 222/54, 204, 394, 416, 222/67, 62; 417/52, 321; 23/267 A

[56] References Cited

U.S. PATENT DOCUMENTS

| | | | |
|---|---|---|---|
| 1,030,378 | 6/1912 | Beckwith | 222/416 X |
| 2,560,523 | 7/1951 | Efford | 222/394 X |
| 3,045,872 | 7/1962 | Hronas et al. | 222/54 X |
| 3,758,276 | 9/1973 | Bond et al. | 23/267 A |

Primary Examiner—Robert B. Reeves
Assistant Examiner—John P. Shannon
Attorney, Agent, or Firm—William S. Rambo

[57] ABSTRACT

A structurally simple device in the form of a closed container and vented outlet conduit operates in accordance with Charles' law to intermittently dispense quantities of a liquid reagent in response to an increase in ambient atmospheric temperatures. The present liquid dispensing device finds particular utility in supplying liquid reagents, such as scale inhibitors, biocides and the like to the water circulating systems of air conditioners.

4 Claims, 2 Drawing Figures

THERMALLY-RESPONSIVE LIQUID DISPENSER

BACKGROUND OF THE INVENTION

This invention relates generally to liquid dispensing apparatus, and more particularly, to a liquid dispenser which is operable automatically in response to an increase in ambient temperature to supply a quantity of a liquid reagent or chemical composition.

The periodic addition or injection of chemicals into a water or other liquid-circulating system to maintain a desired minimum concentration of the chemical is common practice in numerous industrial applications. By way of example, chemicals are injected into the water circulating and cooling towers of air conditioning systems to prevent the deposition of scale, the corrosion of the equipment, and/or the growth of algae and slime.

So-called "chemical treatment" in a given industry may consist in the addition of one or more liquid reagents to a body of water or other liquid, either on a more of less continuous basis, or on a periodic basis. In large installations, the treatment apparatus may be very sophisticated with metering pumps, electronic controls, automatically opening valves, etc., to maintain proper operating conditions. However, with smaller installations the sophisticated machinery and controls become prohibitively expensive and as a consequence simpler methods are used. Examples of the simpler devices are as follows:

1. An adjustable metering pump operating continuously;
2. A metering pump with a timing device to vary the feed according to a preset cycle;
3. Venturi devices;
4. Porous containers of dry chemical deposited in a large storage reservoir designed to allow slow solution of the chemical.

Except for the fourth example, all of the above require precise plumbing fixtures and/or electrical controls and the maintenance and technical adjustment requirements are always a problem.

SUMMARY AND OBJECTS OF THE INVENTION

This invention resides in the combination of a closed, fluid-tight container which is partially filled with the liquid to be dispensed, and a discharge conduit having an intake opening submerged in the liquid in the container, an intermediate portion passing through a fluid-tight seal located in a wall of the container at a level above the liquid, and an outlet end portion extending exteriorly of the container and vented to the atmosphere. As the ambient atmospheric temperature increases, the pressure of the air or gas disposed in the closed space above the liquid in the container momentarily increases to force a quantity of the liquid out through the outlet conduit for discharge into the system to be treated. Conversely, as the outside air temperature decreases, the pressure of the air or gas in the space above the liquid decreases below atmospheric pressure to thus draw outside air backwardly through the discharge conduit and cause it to percolate upwardly through the liquid in the container to relieve the air space above the liquid. The pressure of the air above the liquid in the closed container is thus maintained in substantial equilibrium by the intermittent ejection of quantities of liquid from the container upon a rise in atmospheric temperature, and by the inward suction of atmospheric air into the container upon a decrease in atmospheric temperature.

The present invention is designed to accomplish the same result as the more sophisticated apparatus previously referred to, but without complicated plumbing fixtures and valves, or electrical or electronic circuits and components. The herein described apparatus is not intended for precise ejections of measured amounts of liquid on a predetermined set schedule. Rather it is designed to operate on a schedule which permits relatively wide variations. Scale and corrosion inhibitors used in water cooling towers are an example; there the inhibitor concentration is maintained at levels of 25 to 100 parts per million in the circulating water and anywhere in that range the inhibitors are effective. Thus, the concentration at any one point in time is not critical.

It is the primary object of the present invention to provide a comparatively inexpensive, mechanically simple, yet reliable liquid dispensing device which is operated solely by change in atmospheric conditions.

Another object of this invention is to provide an automatic means for feeding a liquid reagent to a treatment zone in response to an increase in atmospheric temperature.

For a further and more complete understanding of the invention and the various additional objects and advantages attendant thereto, reference is made to the following description and accompanying drawings.

DETAILED DESCRIPTION OF THE PREFERRED EMBODIMENT

Figure 1:
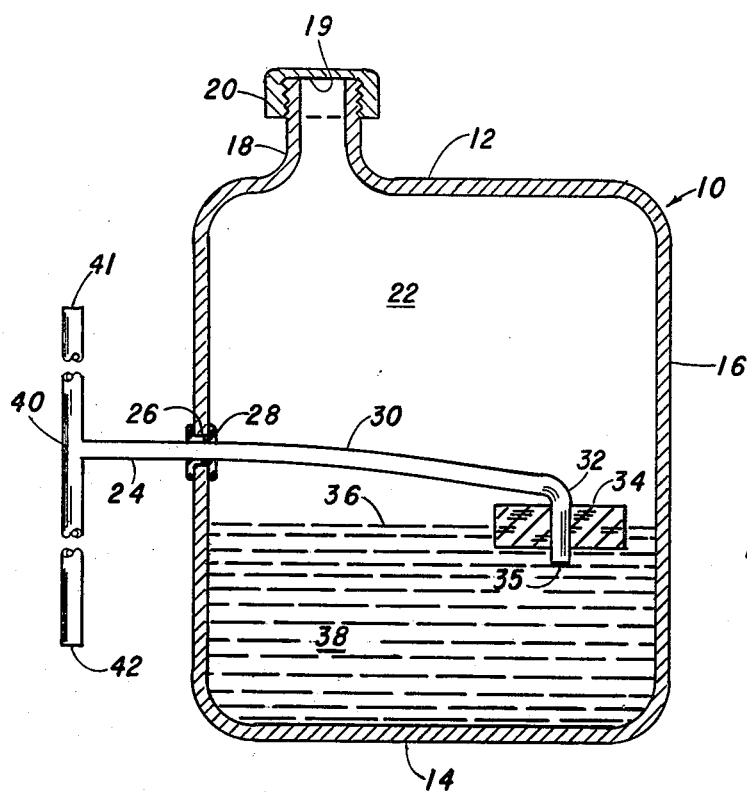
FIG. 1 is a diagrammatic vertical sectional view of a liquid feeding device according to this invention.

Referring now to the drawings, FIG. 1 shows a non-elastic container or bottle which includes a top wall 12, a bottom wall 14 and a sidewall 16. The container also includes a mouth 18 having a filler opening 19 normally closed and sealed by a screw cap 20. The container thus defines a normally fluid-tight enclosure about an internal chamber 22. However, the cap 20 may be easily removed to permit the introduction and replenishment of liquid reagent in the container.

An outlet conduit or tube 24 extends through and is sealed in an aperture 26 in the side wall 16 of the container. The tube may be heat-sealed or welded to the container wall, or a grommet-type compression seal 28 may be positioned in the aperture 26 to provide a fluid tight seal between the intermediate portion 30 of the conduit 24 and the side wall 16 of the container. In the preferred embodiment in FIG. 1, the tube inside the container is flexible and the portion 32 thereof is supported by a buoyant float 34, so that the intake opening 35 of the tube is always submerged slightly below the surface 36 of the body of liquid 38 contained in the container. As will be apparent, the flexibility of tube 24 permits the float 34 to ride up and down on the surface of the liquid as the level of liquid in the container changes upon discharge of liquid therefrom, or upon replenishment or refilling of the container.

Externally of the container, the conduit or tube 24 is formed or otherwise provided with a branched outlet section 40 whose upper end terminates in an atmospheric vent opening 41 and whose lower end terminates in a liquid-discharging outlet 42 which may extend remotely from the container 10.

Figure 2:
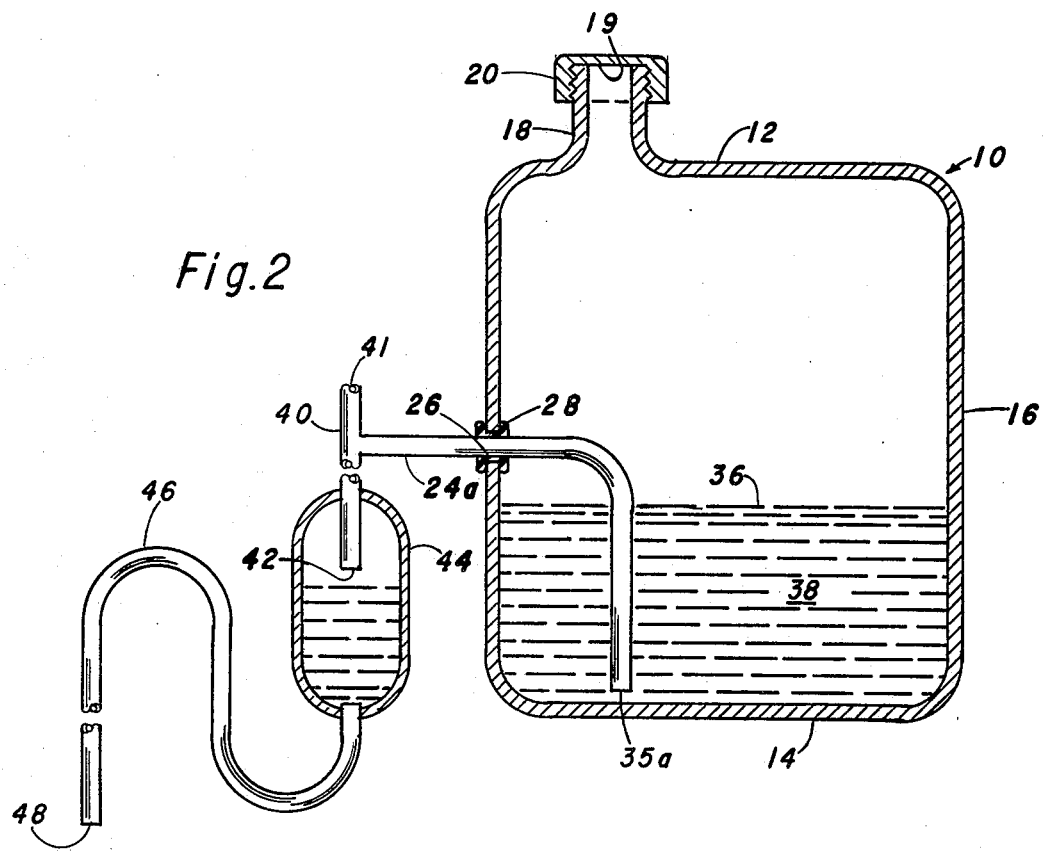
FIG. 2 is a similar view showing a modified form of liquid feeding device according to this invention.

FIG. 2 of the drawings illustrates a slightly modified form of liquid dispenser for periodically discharging predetermined or measured volumes of liquid reagent. The apparatus of FIG. 2 is substantially the same as that illustrated in FIG. 1 except that the flexible conduit or tube 24 is replaced by a rigid, stationary pipe or conduit 24a having an intake opening 35a disposed in closely spaced relation to the bottom of the container. Also, the discharge outlet 42 of the branched section 40 is connected to discharge liquid into a siphon reservoir 44 whose lower end communicates with a U-shaped siphon tube 46 having an outlet 48 arranged to supply liquid to the system to be treated. As will be apparent, the siphon reservoir 44 and U-tube 46 function in the well-known manner to empty the entire contents of the reservoir 44 when the level of liquid in the reservoir and U-tube reaches a height to fill the upper bend of the U-tube. Thus, the siphon reservoir 44 and U-tube 46 function to accumulate liquid which is discharged from the container 10 by way of the outlet 42 until the accumulated liquid reaches a predetermined volume sufficient to fill the U-tube and trigger the siphoning of the contents of the reservoir 44.

OPERATION

The operation of the liquid dispensers illustrated in FIGS. 1 and 2 is fundamentally the same, except that the apparatus of FIG. 2 provides for the accumulation and ultimate discharge of a measured or predetermined quantity of liquid at comparatively wider spaced intervals, whereas the apparatus of FIG. 1 provides for the daily discharge of largely unmeasured or undetermined quantities of liquid from the outlet 42. The preferred embodiment shown in FIG. 1, with the floating suction tube 30, provides a steadier feeding of liquid with less variation, then is possible with a rigid suction tube such as that shown at 24a in FIG. 2.

The apparatus of FIG. 2 is particularly adapted for the feeding of liquid biocides to air conditioning cooling towers, where it is desirable to have intermittent feedings, separated by several days. The interval between successive feedings may be adjusted by varying the size relationship between the dispenser and the siphon reservoir 44.

Considering the apparatus of FIG. 1, the container 10 is partially filled to a level slightly below the aperture 26 with a selected liquid treatment chemical or reagent and the cap 20 is tightly sealed over the filler opening 19. At this time, the temperature and pressure inside the container are identical with the temperature and pressure outside the container. For purposes of explanation, let it be assumed that the container 10 is located in an open, but sun-shaded enclosure outside of a building and it is the coolest part of the day, say early morning. As the day wears on and the atmospheric temperature rises, the liquid and air or gas within the container will be heated to a point where the pressure of the air or gas within the closed space above the liquid 38 will force liquid upwardly and outwardly through the discharge tube or conduit 24 for discharge from the outlet 42 and into the system to be treated. By the same token, the volume of the air or gas above the liquid will increase with the discharge of liquid from the container. With a progressive increase of atmospheric temperature there will be a progressive, albeit intermittent, discharge or ejaculation of liquid from the outlet 42.

Conversely, as the temperature of the ambient atmosphere begins to decrease, say in the late afternoon, the pressure of the air or gas above the liquid in the container will decrease proportionately and atmospheric air will be drawn from the vent 41 backwardly through the outlet conduit 24 to relieve the reduced pressure within the space above the liquid in the container.

Thus, in a manner of speaking, the container "breathes" with change of ambient temperature, so as to "exhale" liquid and "inhale" air. Ordinarily, the "inhaling" of air into the container occurs when temperatures decrease during the evening and night hours, and the "exhaling" of liquid from the container usually occurs when the temperature rises during the daylight hours.

Although the amount of liquid discharged during given time periods will vary with weather or atmospheric conditions, analytical methods have been developed which, in combination with weather data, make it possible to predict, with reasonably good accuracy, the average quantity of liquid which will be discharged from the dispenser in a given period of time.

In the operation of the apparatus illustrated in FIG. 2, it will be obvious that the purpose and function of the siphon reservoir 44 and the siphon tube 46 is to collect a predetermined or measured quantity of liquid from the discharge outlet 42 and then to automatically discharge it in one column or batch through the outlet 48.

Actual experiments have been conducted using apparatus according to this invention to supply chemical solutions to the water being circulated through the cooling tower of a building air conditioning system. A small sun-shading enclosure was used to shield the liquid dispenser from direct sunlight, and the discharge outlet was arranged to direct the chemical liquid directly into the circulating body of water. The following data refers to outside atmospheric temperatures. In both examples which follow, the container was cylindrical, about 40.6 centimeters high and about 28.6 centimeters in diameter.

EXAMPLE I

A rigid outlet conduit, such as indicated at 24 in FIG. 2, was used, but without the siphon assembly of FIG. 2. The container 10 was partially filled with 9,135 cc. of a liquid scale inhibitor and the following readings were taken during the next 25 days. No fluid was added to the container during the 25 day period. In this particular experiment the aperture 26 for the outlet tube 24a was located about 15.9 cm. above the bottom wall 14 of the container.

| Day | Feed, cc | Low Temp. F.° | High Temp. F.° |
|-----|----------|---------------|----------------|
| 1   | 580      | 63            | 84             |
| 2   | 480      | 66            | 85             |
| 3   | 580      |               |                |
| 4   | 680      | 63            | 86             |
| 5   | 650      | 67            | 87             |
| 6   | 555      | 70            | 88             |
| 7   | 0        | 71            | 76             |
| 8   | 310      | 65            | 79             |
| 9   | 200      | 67            | 80             |
| 10  | 245      | 69            | 82             |
| 11  | 230      | 60            | 72             |
| 12  | 155      | 61            | 71             |
| 13  | 0        | 57            | 59             |
| 14  | 225      | 49            | 65             |
| 15  | 520      | 49            | 70             |
| 16  | 520      | 51            | 72             |
| 17  | 480      | 49            | 74             |
| 18  | 495      | 58            | 77             |
| 19  | 325      | 61            | 71             |
| 20  | 105      | 64            | 75             |
| 21  | 380      | 67            | 82             |

-continued

| Day | Feed, cc | Low Temp. F.° | High Temp. F.° |
|---|---|---|---|
| 22 | 295 | 68 | 82 |
| 23 | 0 | 70 | 81 |
| 24 | 215 | 52 | 68 |
| 25 | 630 | 48 | 72 |

For some reason the temperatures of the third day were not recorded and none are shown.

It will be observed also that on days 7, 13, and 23 the temperature variations were such that no treatment chemical was discharged to the system from the container. Thus, it is even further emphasized that this invention is applicable only where very precise concentrations of the treatment chemical are not critical but only where the effective concentrations vary within a relatively large range.

EXAMPLE II

In this instance, the container was filled with 15,830 cc. of aqueous chemical treatment liquid and the aperture 26 was located about 24.2 centimeters above the bottom of the container.

The floating apparatus illustrated in FIG. 1 was used and the following data collected:

| Day | Feed, cc. | Low Temp., F.° | High Temp., F.° |
|---|---|---|---|
| 1 | 200 | 69 | 82 |
| 2 | 185 | 60 | 72 |
| 3 | 205 | 61 | 71 |
| 4 | 0 | 57 | 59 |
| 5 | 280 | 49 | 65 |
| 6 | 425 | 49 | 70 |
| 7 | 640 | 51 | 72 |
| 8 | 435 | 49 | 74 |
| 9 | 425 | 58 | 77 |
| 10 | 315 | 61 | 77 |
| 11 | 175 | 64 | 75 |
| 12 | 365 | 67 | 82 |
| 13 | 285 | 68 | 82 |
| 14 | 0 | 70 | 81 |
| 15 | 330 | 52 | 68 |
| 16 | 455 | 48 | 72 |
| 17 | 345 | 51 | 71 |
| 18 | 435 | 55 | 78 |
| 19 | 320 | 48 | 72 |
| 20 | 435 | 55 | 82 |
| 21 | 145 | 54 | 66 |
| 22 | 0 | 47 | 55 |
| 23 | 375 | 34 | 58 |

Again, it will be observed that no treatment fluid was discharged from the container on days 4, 14, and 22 because of the small temperature differential during that 24 hour period.

In view of the foregoing, it will be seen that the invention provides a mechanically simple, thermally responsive liquid feeding device which is simple in operation, requires almost no maintenance over long periods of time, has substantially no moving parts and requires no outside energy supply to make it operate.

It will be understood by those having ordinary skill in the art that various modifications in the design and details of construction are possible without departing from the spirit of this invention and it is not the intention of the applicant to be limited by the words used to describe the invention herein nor the drawings illustrating the same. Rather, it is the intention of the inventor to be limited only by the scope of the appended claims.

I claim:
1. A liquid dispenser comprising:
   a. a fluid-tight container partially filed with a liquid and having an air space above the liquid;
   b. an open-ended conduit sealed to and extending outwardly through a side of said container a distance above the liquid in said container, said conduit having an inlet end submerged in the liquid in said container and a discharge outlet disposed exteriorly of said container and below the level of liquid therein; and
   c. a vent connected with said conduit exteriorly of said container and at a level above the liquid in said container for venting said conduit to the atmosphere surrounding said container.
2. A liquid dispenser according to claim 1, wherein at least a portion of said conduit within said container is flexible, and wherein the inlet end of said conduit is supported by a float and movable in response to a change in the level of the liquid in said container.
3. A liquid dispenser according to claim 1, including a siphon connected to the discharge outlet of said conduit and operable to accumulate a predetermined volume of liquid discharged from said outlet before discharging the accumulated volume in a single column.
4. A liquid dispenser according to claim 1, wherein said conduit passes through the side of said container at a level approximately one-half the height of the container.

* * * * *